(12) United States Patent
Arai

(10) Patent No.: US 7,258,448 B2
(45) Date of Patent: Aug. 21, 2007

(54) DISPLAY DEVICE

(75) Inventor: Kazuo Arai, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 316 days.

(21) Appl. No.: 11/088,183

(22) Filed: Mar. 24, 2005

(65) Prior Publication Data

US 2005/0212719 A1    Sep. 29, 2005

(30) Foreign Application Priority Data

Mar. 25, 2004   (JP)   ............................. 2004-090176

(51) Int. Cl.
   *G03B 21/14*     (2006.01)
   *G02B 26/10*     (2006.01)
(52) U.S. Cl. ........................... 353/81; 353/13; 359/211
(58) Field of Classification Search ................. 353/46, 353/47, 48, 81, 13; 359/209, 211, 197, 204
   See application file for complete search history.

(56) References Cited

U.S. PATENT DOCUMENTS

| 4,099,172 | A | 7/1978 | Montanari et al. |
| 5,294,940 | A | 3/1994 | Wennagel et al. |
| 5,874,929 | A | 2/1999 | Opower et al. |
| 6,540,362 | B1 * | 4/2003 | Janssen ........................ 353/31 |
| 6,765,544 | B1 * | 7/2004 | Wynne Willson .............. 345/6 |
| 6,827,450 | B1 * | 12/2004 | McGettigan et al. .......... 353/31 |
| 6,831,789 | B2 * | 12/2004 | Chang ........................ 359/634 |
| 2004/0212786 | A1 * | 10/2004 | Koest .......................... 353/81 |
| 2004/0240020 | A1 * | 12/2004 | Schanz ....................... 359/211 |

FOREIGN PATENT DOCUMENTS

| GB | 1 592 789 | 7/1981 |
| JP | 58-105104 A | 6/1983 |
| JP | 07-020794 A | 1/1995 |

\* cited by examiner

*Primary Examiner*—William C. Dowling
(74) *Attorney, Agent, or Firm*—Foley & Lardner LLP

(57) ABSTRACT

A display device has plural light emitting elements disposed in line, a first optical system to diverge light emitted from the light emitting elements, and a second optical system to converge the light passing through the first optical system. The first optical system is rotatable by a rotating unit which a control unit controls. The control unit also controls lighting-on and lighting-off of the light emitting elements in sync with rotary movement of the first optical system and according to image information to be displayed, thereby the second optical system converging the light to produce the image information.

19 Claims, 17 Drawing Sheets

$A_{LED}$ $A_{LED}$

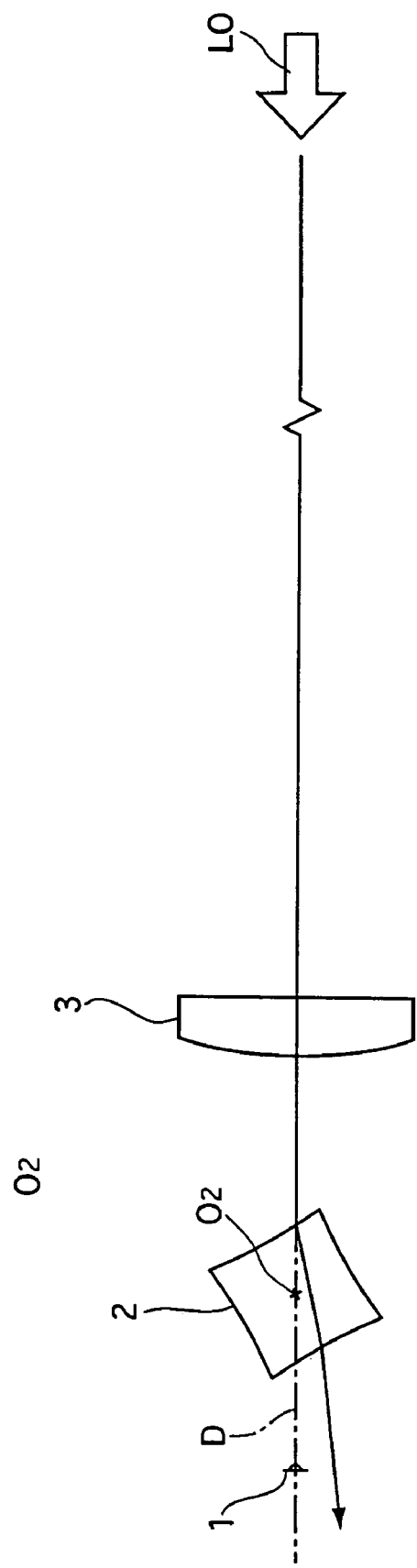

DISPLAY DEVICE

BACKGROUND OF THE INVENTION

1. Field of the Invention

The present invention relates to a display device which can provide a virtual display image based on image information, such as display image on driving information to be produced on a window glass of motor vehicles, boats and ships, aircrafts, and so forth, for example.

2. Description of the Related Art

A display device of this kind is disclosed in Japanese patent laying-open publication No. (Tokkaihei) 7-20794. This display device includes plural light emitting elements disposed in line, a polygonal column-like mirror with plural reflective surfaces, a lens to diverge light emitted from the light emitting elements, a drive unit to rotate the mirror, a screen to display two-dimensional image, and a controller to control light-on timing of the light emitting elements selectively according to a rotational position of the mirror.

The above known conventional display device, however, encounters a problem that the screen causes light energy loss much for displaying an image on driving information of motor vehicles, boats and ships, aircrafts, and the like, for example, because the screen diffuses the light. In order to settle this problem, a larger light source is needed. This brings the display device larger dimensions, increase in electric power consumption and heating value, expensive manufacturing cost, and life-cycle aggravation of light emitting elements.

It is, therefore, an object of the present invention to provide a display device which overcomes the foregoing drawbacks and can decrease light energy loss, its manufacturing and running costs, and its dimension with obtaining sufficient display-brightness.

SUMMARY OF THE INVENTION

According to a first aspect of the present invention there is provided a display device to produce a virtual display image based on image information, the display device comprising: a plurality of light emitting elements disposed in line; a first optical system made of a translucent medium in which light emitted from the light emitting elements to enter the translucent medium is diverged after passing through the first optical system; a rotating unit to rotate the first optical system; a control unit to control lighting-on and lighting-off of the light emitting elements in sync with rotary movement of the first optical system and according to the image information to be displayed; and a second optical system to converge the light passing through the first optical system and entering the second optical system to produce the virtual display image.

BRIEF DESCRIPTION OF THE DRAWINGS

The objects, features and advantages of the present invention will become apparent as the description proceeds when taken in conjunction with the accompanying drawings, in which:

FIG. 8 is a schematic diagram illustrating a state in which rotary movement of the first optical system is stopped when the virtual display image is not produced;

DETAILED DESCRIPTION OF THE PREFERRED EMBODIMENTS

Figure 1:
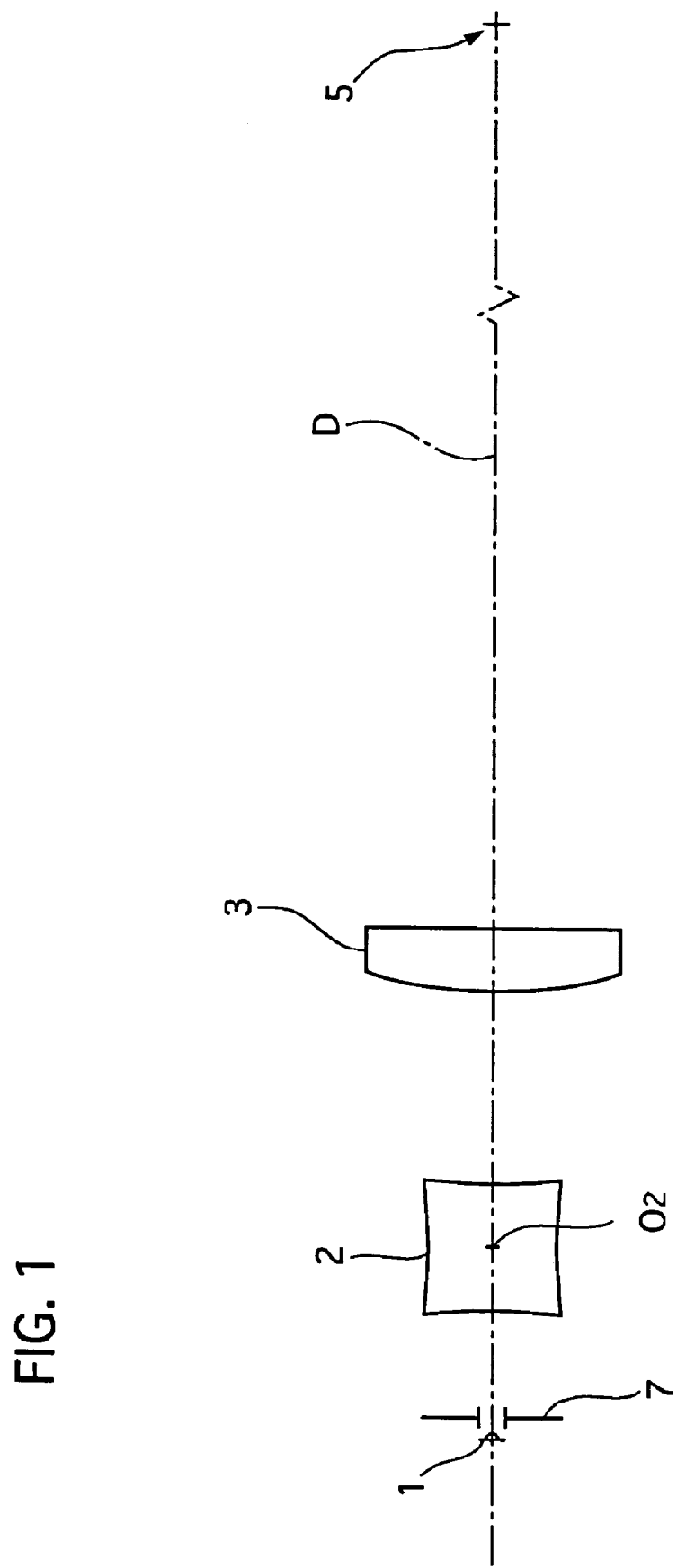
FIG. 1 is a schematic side view showing an optical system of a display device of a first embodiment according to the present invention.

Throughout the following detailed description, similar reference characters and numbers refer to similar elements in all figures of the drawings, and their descriptions are omitted for eliminating duplication.

Referring to FIGS. 1 to 8 of the drawings, there is shown a first preferred embodiment of a display device according to the present invention.

Figure 2:
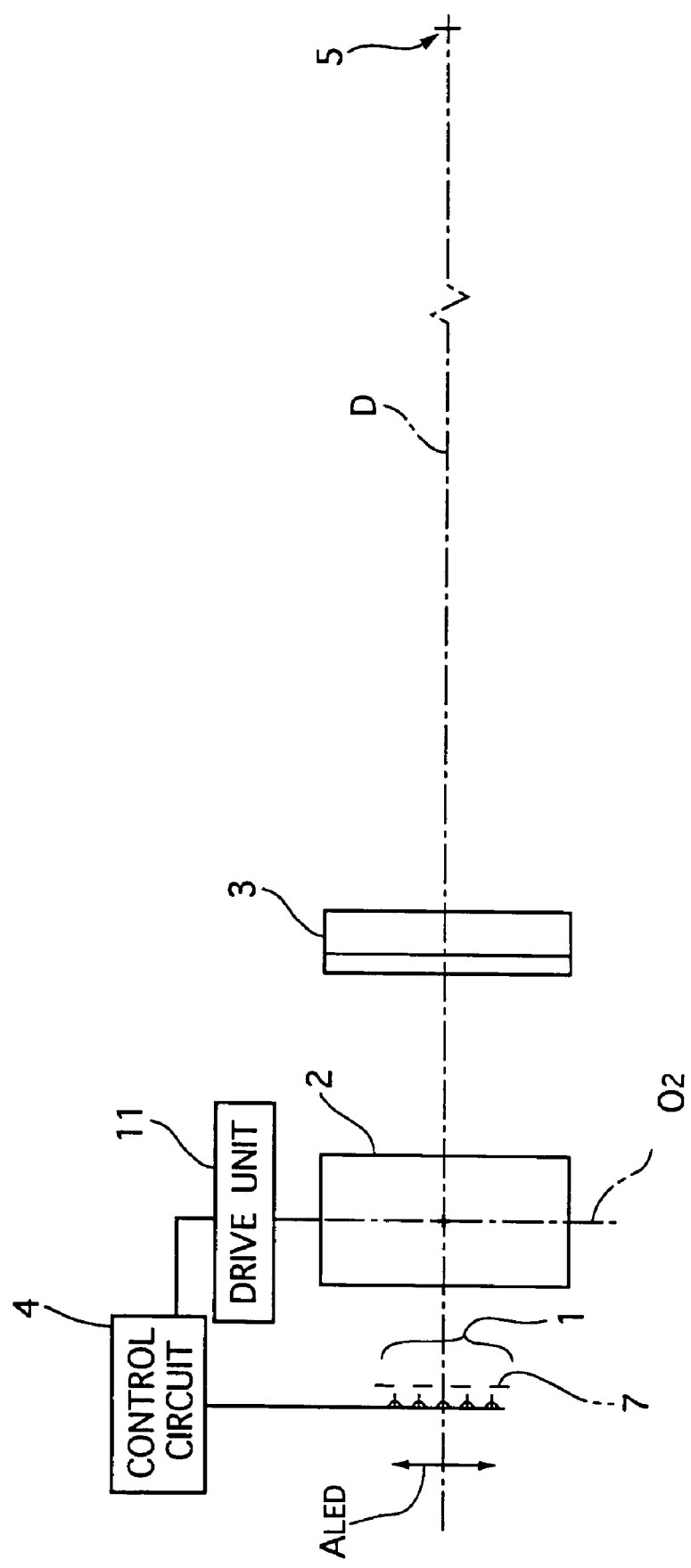
FIG. 2 is a schematic plan view showing the optical system and an electronic system used in the display device of the first embodiment shown in FIG. 1.

FIGS. 1 and 2 schematically shows a display device of the first embodiment, which is used for motor vehicles. The display device has an optical system and an electronic system. The optical system includes a light emitting diode (LED) array 1, slit plate 7, a prism 2, and a plano-convex lens 3, and the electronic system includes a control circuit 4 and a drive unit 11. The control circuit 4 acts as a control unit of the present invention, and the drive unit 11 acts as a rotating unit of the present invention.

The LED array 1 is made up of five LEDs, which is disposed in a straight line. The LED array 1 is controlled by the control circuit 4 so that properly selected parts of the LEDs are switched on to emit light according to contents of image information and rotation angles of the prism 3. The LED acts as a light emitting element of the present invention, and the LED array 1 acts as light emitting elements of the present invention.

The slit plate 7 has a slit, which is formed in a parallel relationship with the straight line so as to allow light emitted from the LED array 1 to pass therethrough and travel toward the lens 3.

The prism 2 is made of a translucent material, a transparent acrylic in this embodiment. The prism 2 is formed by using injection molding to be shaped like a polygonal column having four side surfaces, each of which is formed to have a concave curve of radius 100 mm in cross-section. The distances between the surfaces opposite to each other are set to be 20 mm. The prism 2 is connected with and rotated around its central axis $O_2$ by the drive unit 11 having an electric motor, which is controlled by the control circuit 4. The prism 2 acts as a first optical system of the present invention.

The plano-convex lens 3 is made of glass BK7 to form a cylindrical lens having a convex surface at its prism side and a flat surface at its opposite side. It has a radius of 70 mm and a thickness of 10 mm in cross-section. The lens 3 acts as a second optical system of the present invention.

The LED array 1, the prism 2, and the lens 3 are arranged in a sequential order on a main optical axis D that connects the central axis $O_2$ of the prism 2 and an optical center of the lens 3. The prism 2 and the lens 3 are designed so that the prism 2 diverges the light emitted from the LED array 1 only on a plane perpendicular to the main optical axis D and also to a plane on which the main optical axis D and the LEDs are located, and so that the lens 3 converges it also only on the above plane. The light passing through the lens 3 strikes an eye point 5 of a user (a driver).

Figure 7:
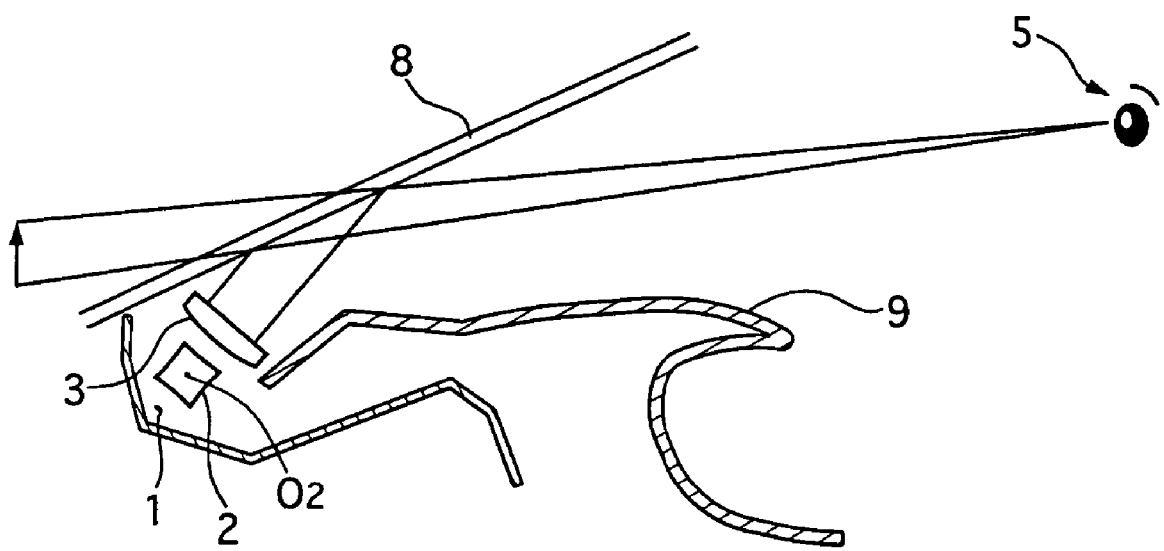
FIG. 7 is a schematic side view showing an instrument panel of a motor vehicle provided with the display device shown in FIG. 1.

As shown in FIG. 7, the above-constructed display device is installed in an instrument panel 9 and under a front window glass 8 of a motor vehicle. The light outputted from the display device is reflected from the widow glass 8 and travels to the eye point 5, which enables the driver to see a virtual display image without a screen.

The operation and advantages of the display device of the first embodiment will be described.

Figure 17:
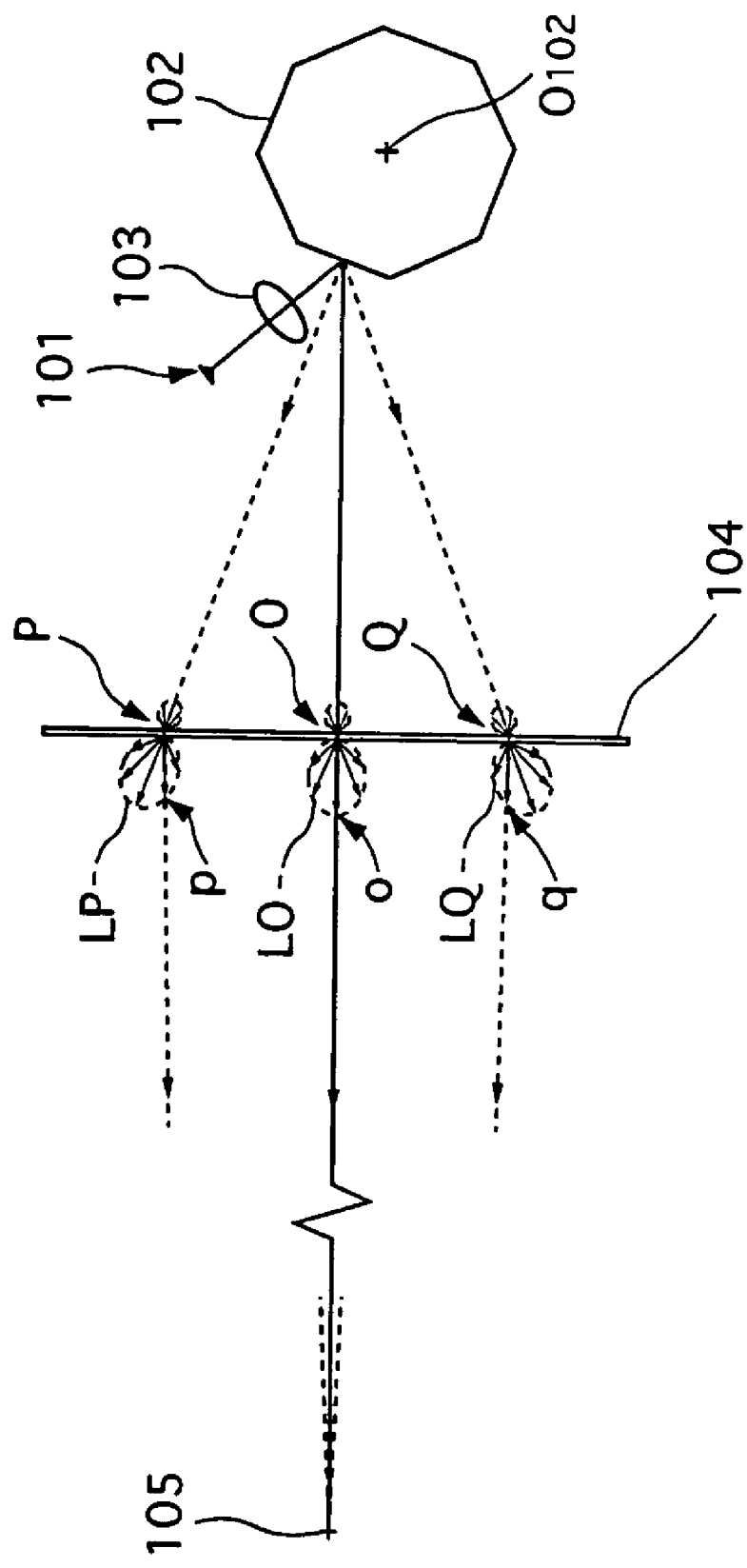
FIG. 17 is a schematic diagram illustrating beam paths in a screen display device having a screen and a polygonal column-like mirror, for comparison to those in the display device shown in FIG. 1.

First, for easy understanding of the disadvantages of a screen, a screen display device having a screen and a polygonal column-like mirror instead of a prism will be described with reference to the accompanying drawing of FIG. 17. FIG. 17 shows light paths obtained in the screen display device.

The screen display device includes a screen 104, a polygonal column-like mirror 102, a double convex lens 103, and an LED array 101.

The screen 104 is made of a translucent material, such as a transparent member with a satin-finished front and rear surfaces, a milky screen, or the like, and disposed between the mirror 102 and an eye point 105 of a driver.

The polygonal column-like mirror 102 is rotatable around a central axis $O_{102}$ by a not-shown electric motor.

The double convex lens 103 concentrates light emitted from the LED array 101 into a surface of the mirror 102.

The LED array 101 has plural LEDs disposed in a straight line for emitting the light. The LED array 101 and the motor are controlled by a not-shown control circuit.

When the mirror 102 is positioned at a reference angle (a rotation angle where the mirror 102 is in a state shown in FIG. 17), light emitted from the LED array 101 passes through the lens 103 and reflects from the surface of the mirror 102, then traveling toward the screen 104. The light attacks a center position O of the screen 104, where a display image is produced. When the mirror 102 is rotated by ±10 degrees from the reference angle, images are produced on positions P and Q of the screen 104, respectively.

In the screen display device, the screen 104 generates ray groups LP, LO, and LQ, in an ellipse-like configuration, diffusing in all possible directions including a translucent direction and a reflectional direction from incident light, according to the rotation angles of the mirror 102. Among these diffused rays, only rays o, p, and q in FIG. 17, traveling in a direction where the ray groups LP, LO, and LQ and the eye point 105 are located, can reach the eye point 105 and be seen by the driver, but the other rays of the ray groups LP, LO, and LQ can not reach the eye point 105, and accordingly they are invisible to the driver.

As described above, the screen 104 causes large energy loss for displaying. In order to obtain sufficient display brightness of the image by using the screen 104, the screen display device needs a larger light source so as to compensate the energy loss due to the screen 104, which causes the screen display device to be larger in dimension, with increasing manufacturing and running costs, electric power consumption, and heat generation, and in addition shortening product cycle of the light source due to the heat generation.

Besides, the polygonal column-like mirror 102 is expensive to be manufactured, because it is manufactured generally by cutting or grinding an aluminum bar so as to have high precision and high surface-roughness. In addition, it requires protective coating after cutting or grinding, which drives up the cost.

In contrast, the display device of the first embodiment can remove a screen and a polygonal column-like mirror, as described above, so as to settle the disadvantages of the screen display device.

In this display device shown in FIG. 1, the LEDs of the LED array 1 emit a beam toward the prism 2 through the slit of the slit plate 7.

For ease of explanation, herein a reference angle of the prism 2 is designated by the angle at which the prism 2 is positioned in FIG. 1.

Figure 3:
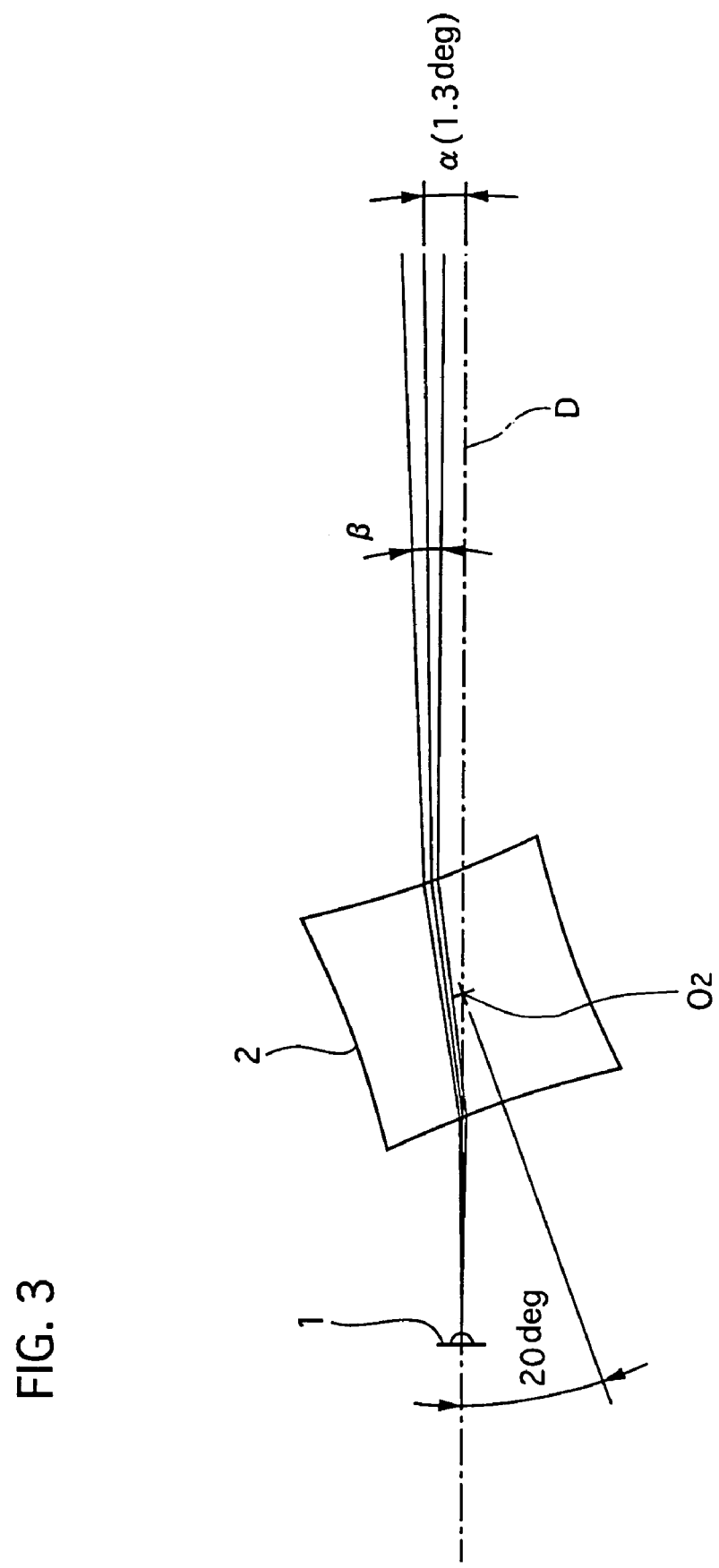
FIG. 3 is a schematic diagram showing a state in which light is slanted by a first optical system of the optical system of the display device shown in FIG. 1.

The beam is slanted by the prism 2 in a direction away from the optical axis D according to a rotation angle of the prism 2., except the reference angle. For example, FIG. 3 shows a state of the beam slanted when the prism 2 is rotated counterclockwise to be positioned at an angle of 20 degrees with respect to the reference angle, where an angle α of the beam passing through the prism 2 becomes about 1.3 degrees. In this way, an exiting angle α of the beam passing through the prism 2 is determined at an arbitrary rotation angle of the prism 2.

Figure 4:
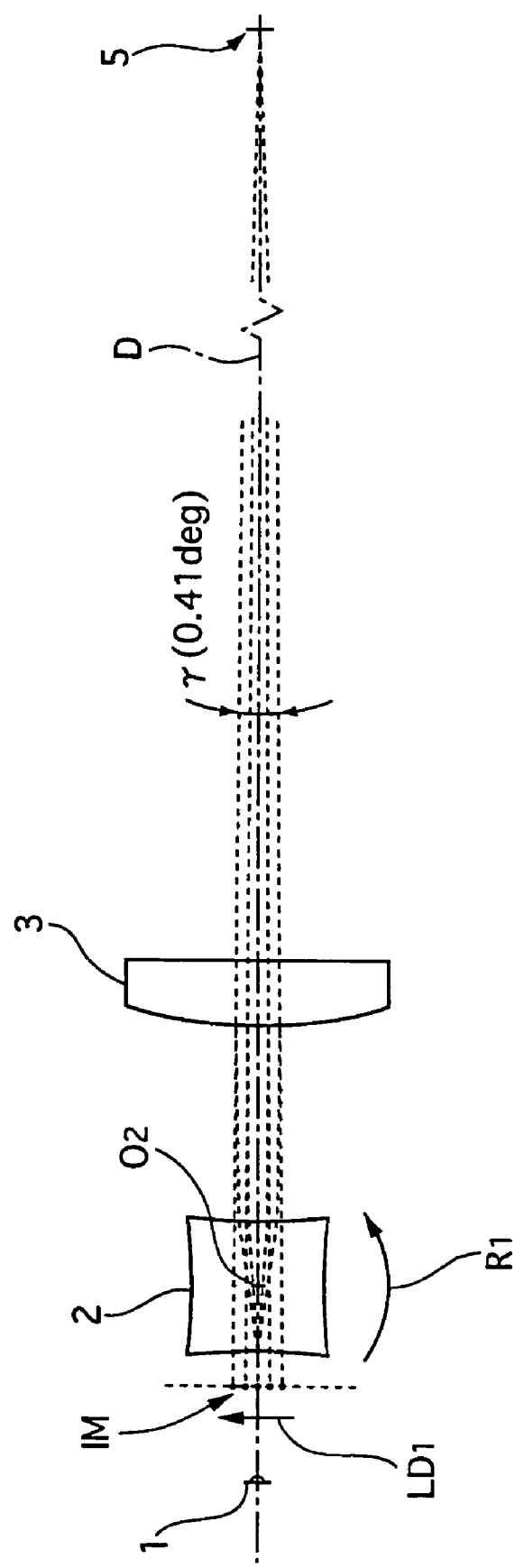
FIG. 4 is a schematic diagram illustrating production of a virtual display image obtained by the display device shown in FIG. 1.

As seen from the above description, when the prism 2 is rotated in a counterclockwise direction $R_1$ and arrives in a sequential order, for example, at an angle of 20 degrees in a clockwise direction from the reference angle, at an angle of 10 degrees in the clockwise direction from the reference angle, at an angle of 0 degree (equal to the reference angle), at an angle of 10 degrees in the counterclockwise direction from the reference angle, and at a 20 degrees in the counterclockwise direction from the reference angle, the beams are slanted at different exiting angle according to the rotation angles of the prism 2 and enter the lens 3 as shown in FIG. 4. The beams exiting from the prism 2 enter the lens 3, and are hereby converged so as to travel to the eye point 5.

The display device with the above structure can produce a virtual display image IM consisting of five virtual LED images by rotating the prism 2, and accordingly the image is observable from the eye point 5 about 15 mm in front of (eye-point side of) the LED array 1. This virtual display image is produced sufficiently on a high level where astigmatism of the prism 2 and the lens 3 can be negligible. Incidentally, the astigmatism occurs, because the prism 2 diverges the light and the lens 3 converges it on the plane.

A display angle γ in a rotary scanning direction becomes about 0.41 degrees in a case that the prism 3 rotates from a position of 30 degrees in the clockwise direction from the reference angel to that of 30 degrees in the counterclockwise direction from the reference angle. This display angle γ corresponds to an apparent angle in the rotary scanning direction of the display image that is visible from the eye point 5, that is, display dimensions. The virtual display image is produced in its movement direction indicated by an arrow $LD_1$ in FIG. 4.

Figure 6A:
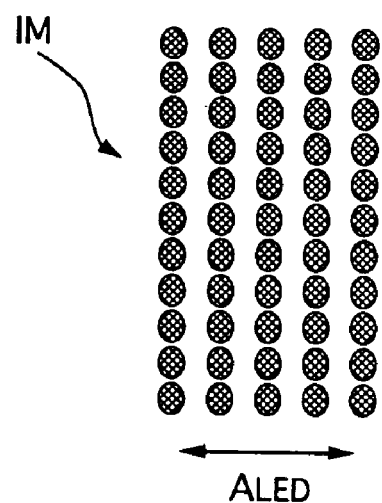
FIG. 6A is a schematic diagram showing one example of the virtual display image produced by the display device.

When the prism 2 reaches each predetermined angle, the LEDs of the LED array 1 are turned on for a certain period. The rotation control of the prism 2 and the light-on control of the LEDs are performed at high speed, which gives a two-dimensional virtual display image IM shown in FIG. 6 due to persistence of vision to a user. This virtual display image IM in FIG. 6A is generated by five (transversal) by eleven (vertical) dots. An arrow ALED indicates an alignment direction of the LEDs of the LED array 1. A transversal part of the display image IM is obtained based on the five LEDS disposed in line of the LED array 1. Vertical parts of the display image IM are obtained due to persistence of vision by controlling light-on of the LED array 1 eleven times according to the rotation angles of the prism 2.

The user sees each virtual display image IM of the LEDs to be oblong in FIG. 6A although the LEDs are in a round shape, because the prism 2 rotates at a constant angular speed and lighting on time of the LEDs is finite. The vertical length of the LED display image is adjustable by changing slit size of the slit plate 7 shown in FIG. 1.

The rotation control of the prism 2 and the turning-on control of the LEDs are performed by the control circuit 4 and the drive unit 11 as follows.

Figure 5:
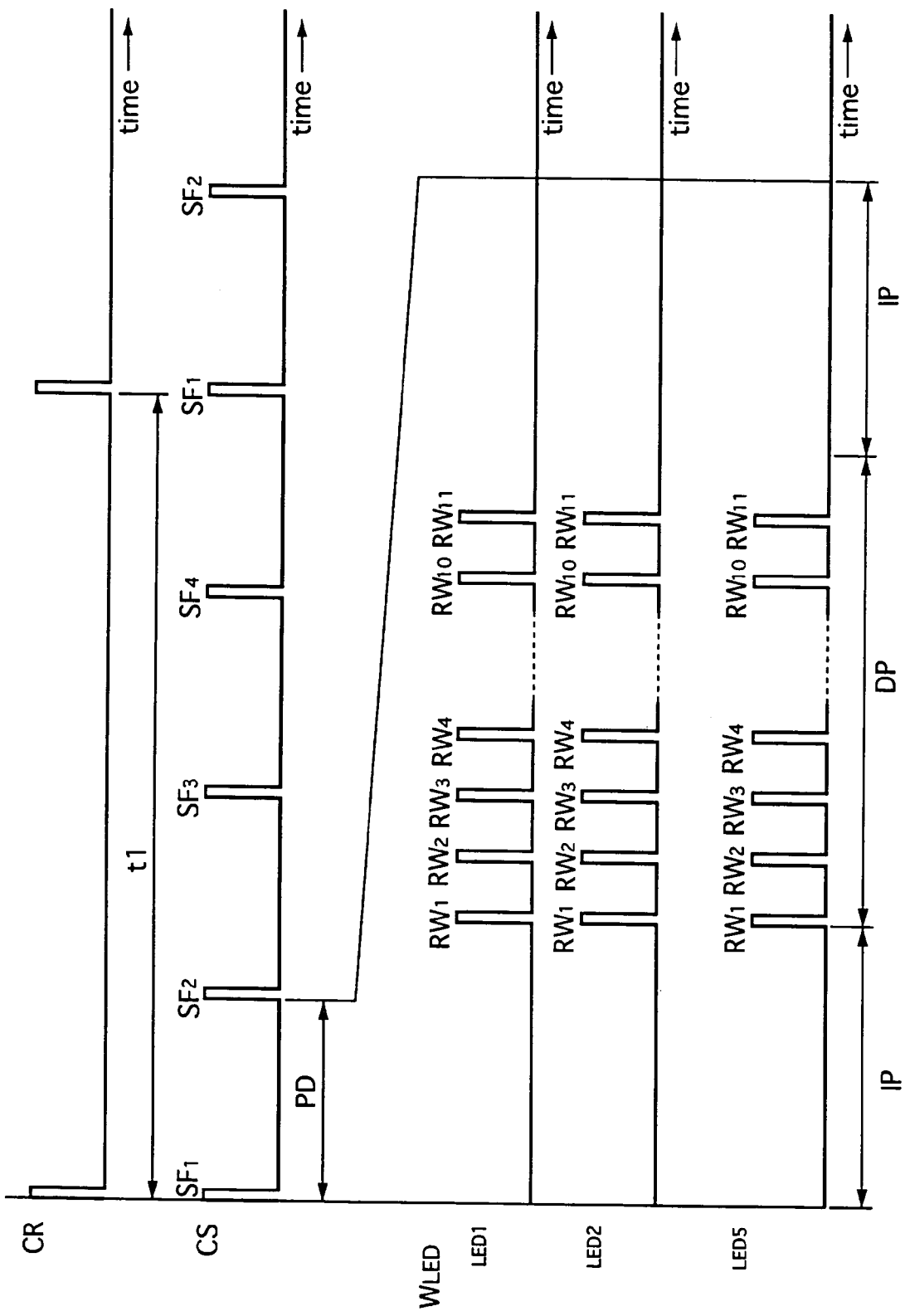
FIG. 5 is a time chart of rotation control of the first optical system and light-on control of light emitting elements which are performed in the display device shown in FIG. 1.

FIG. 5 shows a time chart of the rotation control of the prism and the light-on control of the LEDs of the LED array 1.

A rotation clock signal CR is generated each time when the prism 2 rotates through one revolution. Accordingly, a rotation time interval t1 between adjacent rotation clock signals CR corresponds to a period when the prism 2 rotates through one revolution.

A surface clock signal CS is generated each time when each surface of the prism 2 passes through a predetermined position. In this embodiment, the surface clock signals CS are generated four times as indicated by pulses $SF_1$ to $SF_4$ during two rotation clock signals CR. A display cycle PD between the adjacent pulses $SF_1$ to $SF_4$ of the surface clock signal CS corresponds to a time interval which is needed for producing one display. Each LED of the LED array 1 is provided with driving electric current for a display period DP after a predetermined idle period IP, every time the pulse $SF_1$, $SF_2$, $SF_3$, or $SF_4$ of the surface clock signal CS outputs during one cycle period of the surface clock signal CS. Pulses $RW_1$ to $RW_{11}$ of the electric current is supplied with the LEDs eleven times during one display cycle PD in this embodiment as shown in FIG. 5A. Note that FIG. 5 shows waveform $W_{LED}$, illustrated in enlargement, of the drive electric current supplied in the one display cycle PD between the pulses $SF_1$ and $SF_2$. Besides, FIG. 5 illustrates only a first, second, and third LEDs, but omits a third and a fourth LEDs, for simplicity.

Subsequently, each LED repeats to emit the light by being provided with the same drive electric current until display contents is changed every time the pulse $SF_1$, $SF_2$, $SF_3$, or $SF_4$ of the surface clock signal CS rises. This produces the virtual display image due to persistence of vision.

In order to obtain the display image due to persistence of vision without flicker, the image production generally requires a cycle of at least 50 Hz, preferably equal to or more than 100 Hz. In this embodiment shown in FIG. 5, the display cycle is set to be 100 Hz, and then the display cycle PD between the pulses of the surface clock signal CS becomes 0.01 seconds, and the rotation time interval t1 between the adjacent pulses of rotation clock signal CR becomes 0.04 seconds.

That is, the drive unit 11 drives the prism 2 to rotate one revolution in 0.04 seconds, 1500 r.p.m. This rotation speed is relatively low for current electric motors, which brings the motor a low manufacturing and running cost, a long product life, and easy control.

Figure 6B:
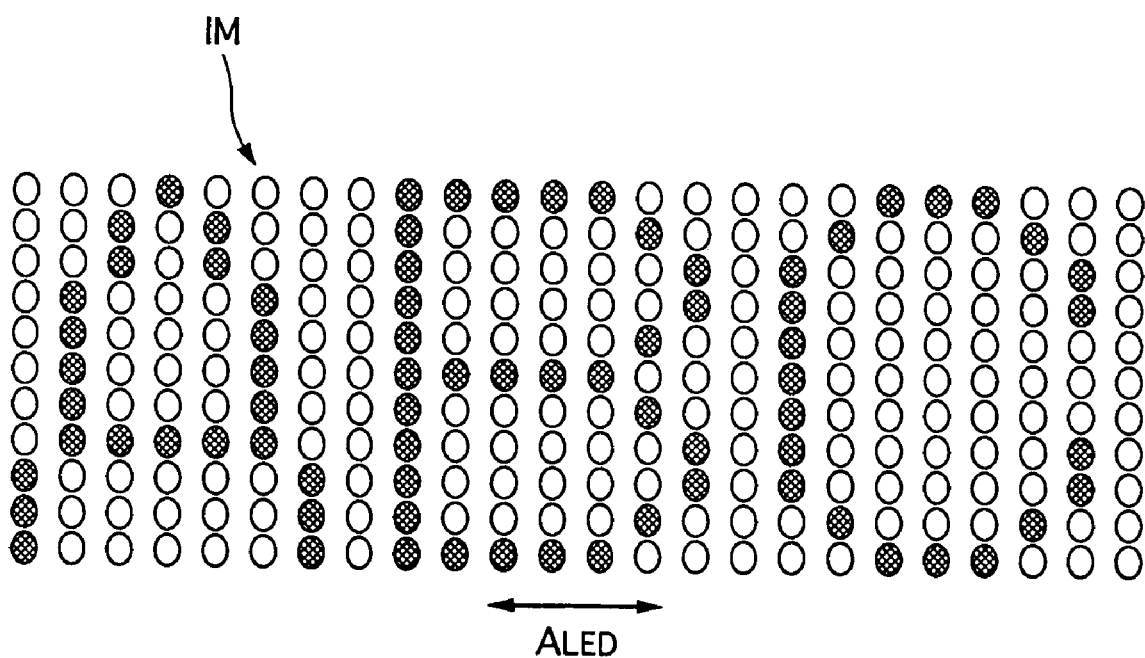
FIG. 6B is a schematic diagram showing another example of the virtual display image produced by the display device.

In this embodiment, five LEDs are used in the LED array 1, but the LED array 1 may have more or less LEDs according to need so as to change a transversal size of the display image. FIG. 6B shows an LED array having 24 LEDs and displaying letters of "A B C", for instance.

In order to stop the rotation movement of the prism 2 of the display device of the first embodiment, the control circuit 4 makes the drive unit 11 stop so that the surface of the prism 2 is positioned in a position different from that where it is positioned when the LEDs emits. In this position, the outside light such as sunlight entering and passing through the prism 2 is refracted by the prism 2 and travel away from the LED array 1. This refraction prevents the LED array 1 from being deteriorated by the outside light.

The display device of the first embodiment removes a screen, which causes the light energy loss, because the light passing through and reflecting on it is diffused. Therefore, the display device can use an LED array of a relatively low output capacity, which brings it to decrease its manufacturing cost. Besides, the display device can prevent display contrast of the entire display image from its deterioration due to the outside light entering the prism 2 and/or others, since it has no screen.

The two-dimensional display image can be produced by using the LED array 1, the prism 2 (the first rotating optical system), and the lens 3 (the second optical system), which enables the display unit to remove a liquid crystal display, an expensive one, resulting in its cost reduction.

The prism 2 can be formed by injection molding of transparent resin, which enables it to decrease its manufacturing cost.

In the display device of the first embodiment, each of the prism 2 and the lens 3 has no function converging in the LED arrangement direction of the LED array 1. This can bring the following functions.

Both of the prism 2 and the lens 3 has no diverging function or converging function on a plane determined by the LED arrangement direction of the LED array 1 and the optical axis of the light emitted from the array 1. Therefore, variation of display distortion on the plane is suppressed at low level even when an eye point 5 of a user relatively moves a long distance.

In general, a user who observes a display image in a motor car, a driver, has an eye range, corresponding to a range where an eye point is, having longer in a transversal direction of the motor vehicle than in a vertical direction according to a document of "JIS D 0021 Eye range of drivers for automobile".

Accordingly, the LEDs of the LED array 1 are disposed in the transversal direction of a motor vehicle in the display device of the first embodiment. This can provide a display image with little distortion in a wide eye range.

The display device of the first embodiment has the following advantages.

The display is constructed to have the LED array 1 with the LEDs disposed in line, the prism 2 made of translucent material for diverging the light that enters from the LED array 1 and passes therethrough, the drive unit 11 to rotate the prism 2, the control circuit 4 to control lighting-on and lighting-off of the LED array 1 in sync with the rotary movement of the prism 2 according to an image information to be displayed, and the lens 3 for converging the light that enters from the prism 2 and passes therethrough. The light is emitted from the LED array 1 to enter the rotating prism 2, and its rays are slanted away from the main optical axis D according to the rotation angle of the prism 2. The slanted rays are slanted again by the conversing lens 3 to travel toward the eye point 5 of the user. The light-emitting control of the LED array 1 with the LEDs disposed in line produces a two-dimensional virtual display image, which is visible to a user due to persistence of vision, without a screen.

The converging optical system may employ a convex lens, a concave mirror, a Fresnel lens, or a Fresnel mirror.

The display device can decrease a light energy loss because of removal of a screen and so forth, which enables the display device to use a light source of a low output capacity and small size, resulting in cost reduction. Besides, the display device does not need a polygonal column-like mirror, resulting in further cost reduction. Because of no screen, the display device can suppress deterioration of display contrast due to the outside light entering the display device.

The prism 2 is formed to have at least two surfaces: a first surface that the light enters and a second surface that the light exits. The surfaces are formed to have a shape like a double-concave lens so that the first surface and the second surface haves the same configuration. The prism 2 is controlled to rotate by the drive unit 11 so as to be positioned in the predetermined rotation angles in turn, and accordingly the same configuration of the surfaces appears with respect to the entering light and the emitting light. This rotation control of the prism 2 brings load reduction of the drive unit 11, resulting in low electric power consumption, downsizing, reduction of noise, and a longer operating life of the display device.

Besides, a period unavailable for producing a display image during the rotation of the prism 2 can be reduced, which brings reduction of light-emitting energy of the LED array 1, resulting in a low electric power consumption, downsizing, reduction of noise, and a longer operating life of the display device.

The prism 2 and the les 3 are constructed to converge the light only on the plane perpendicular to the plane determined by the LED arrangement direction of the LEDs disposed in line and the optical axis of the rays emitted from the LED array 1. Therefore, the prism 2 and the lens 3 are prevented from converging the entered light in the LED arrangement direction, so that variation of display distortion is suppressed at low level even when the eye point 5 of the user moves a relatively long distance in the LED arrangement direction.

The drive unit 11 is constructed to stop the rotation of the prism 2 at a rotation angle where the entered light exits from the prism 2 with being slanted away from the LED array 1. Therefore, when outside light such as sunlight is reflected on the window glass and enters the prism 2 through the lens 3, the prism 3 refracts the entered light in a direction where the LED array 1 does not exist, and prevents the light from traveling to the LED array 1. This enables the LED array 1 to be protected from destruction due to heat of the sunlight.

Next, a display device of a second embodiment according to the present invention will be described with reference of the accompanying drawings of FIGS. 9A to 12.

Figure 9A:
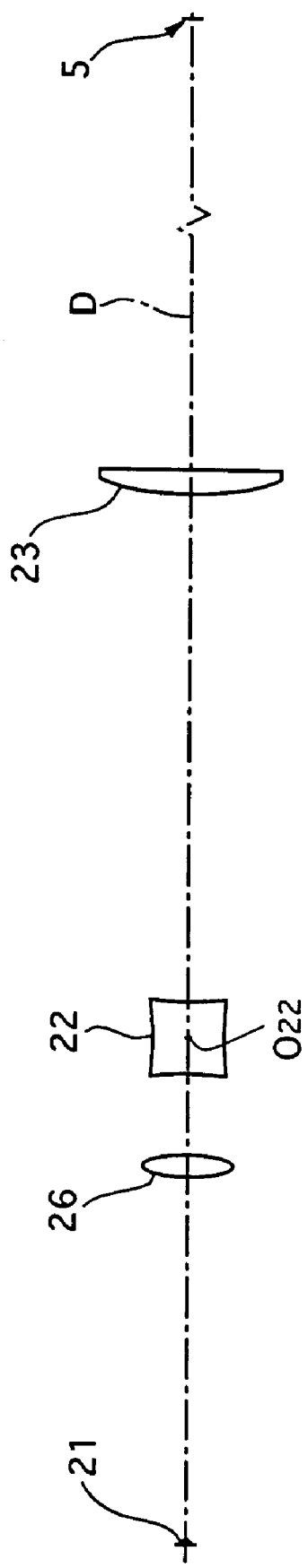
FIG. 9A is a schematic side view showing an optical system of a display device of a second embodiment according to the present invention.
Figure 9B:
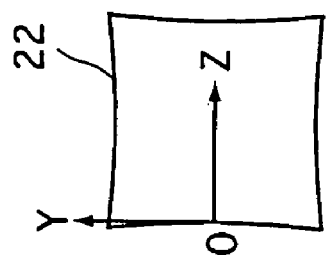
FIG. 9B is an enlarged side view showing a prism used in the display device shown in FIG. 9B.
Figure 10:
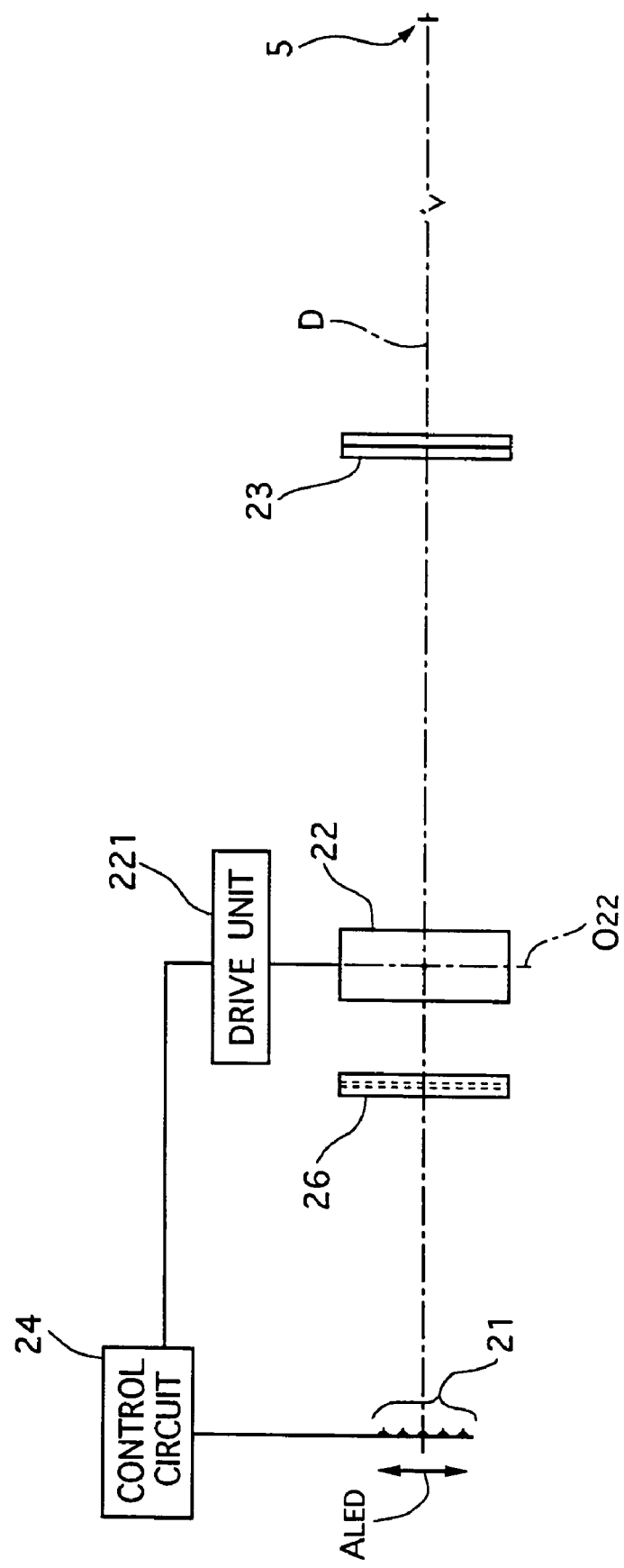
FIG. 10 is a schematic plan view showing the optical system and an electronic system used in the display device of the second embodiment shown in FIG. 9A.

Referring to the drawings of FIGS. 9A, 9B, and 10, the display device of the second embodiment is provided with a double-convex lens 26 between an LED array 21 with LEDs disposed in line and a prism 22 so as to enlarge a rotary-scanning directional size of a display image. The double-convex lens 26 acts as a third optical system of the present invention.

In order to enlarge the rotary-scanning directional size of the display image, the prism 22 is designed to have a larger deflection amount. A divergence power of the prism 22 is namely increased, which is analogized from the drawing of FIG. 3. Note that the more divergence power is increased, the larger a divergence angle β shown in FIG. 3 becomes, which causes difficulties in production of satisfactory image. In order to dissolve this problem, the lens 26 is provided for converging the light at a position the between the prism 22 and a plano-convex lens 23 so as to enlarge the light that enters the lens 23. The prism 22 acts as a first optical system of the present invention, and the lens 23 acts as a second optical system.

The prism 22 is made of translucent material, such as acrylic, to be formed by injection molding to have a shape like a square column with four aspheric concave surfaces in cross-section. The opposite surfaces are 15 mm apart from each other. Configurations of the surfaces are expressed by the following equation.

$$Z=(Y^2/RDY)/[1+\{1-(1+K)\cdot Y^2/RDY^2\}^{1/2}]$$

where Z is a distance in a Z-axis direction from a Y-axis as shown in FIG. 9B, RDY=70, and K=−1.

The prism 22 is driven to rotate around a center axis $O_{22}$ by a drive unit 221, which is provided with a not-shown electric motor and controlled by a control circuit 24.

The lens 23 is made of glass BK7 to form a cylindrical lens having a convex surface at its prism side and a flat surface at its opposite side. It has a radius of 70 mm and a thickness of 10 mm in cross-section.

The lens 26 is made of glass BK7 to form a cylindrical lens having a convex surface at its both sides. It has a radius of 25 mm and a thickness of 5 mm in cross-section.

The prism 22, the lens 23, and the lens 26 are set to diverge or converge beams only on a plane perpendicular to a main optical axis D of them and also to a plane on which the main optical axis D and the LEDs are located, similarly to those of the first embodiment. The LED array 21, the lens 26, the prism 22, and the lens 23 are arranged in a sequential order in front of an eye point 5 of a user.

Note that this display device of the second embodiment has not a slit plate, although the slit plate 7 is used between the LED array 1 and the prism 2 in the display device of the first embodiment shown in FIGS. 1 and 2.

The operation and advantages of the display device of the second embodiment will be described with reference to the accompanying drawings of FIGS. 9A to 12.

The functions and principle of producing a two-dimensional virtual display image are similar to those of the first embodiment. Specifically, the image is produced by light-emitting control of the LEDs according to rotation angles of the prism 22 so as to be seen due to persistence of vision by a user.

Figure 11:
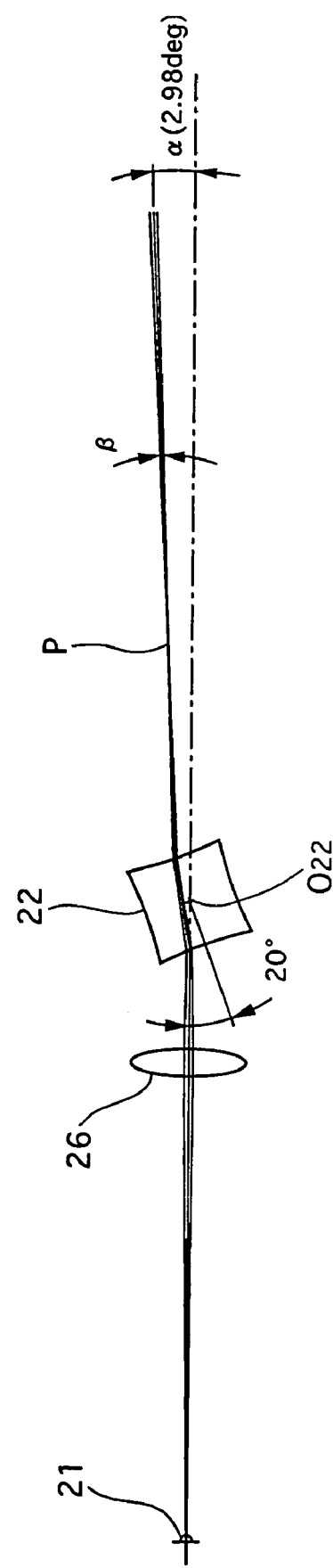
FIG. 11 is a schematic diagram showing a state in which light emitted from an LED array is slanted by a first optical system and a third optical system of the optical system of the display device shown in FIG. 9A.

Beams are slanted away from the main optical axis D according to the rotation angles of the prism 22. FIG. 11 shows a state in which the beam is slanted when the prism 22 is rotated 20 degrees counterclockwise from a reference angle. The beam is slanted by an angle of $\alpha$ with a diffusion angle of $\beta$, which is equal to about 3.0 degrees, more properly 2.98 degrees, from the axis D in this case.

Figure 12:
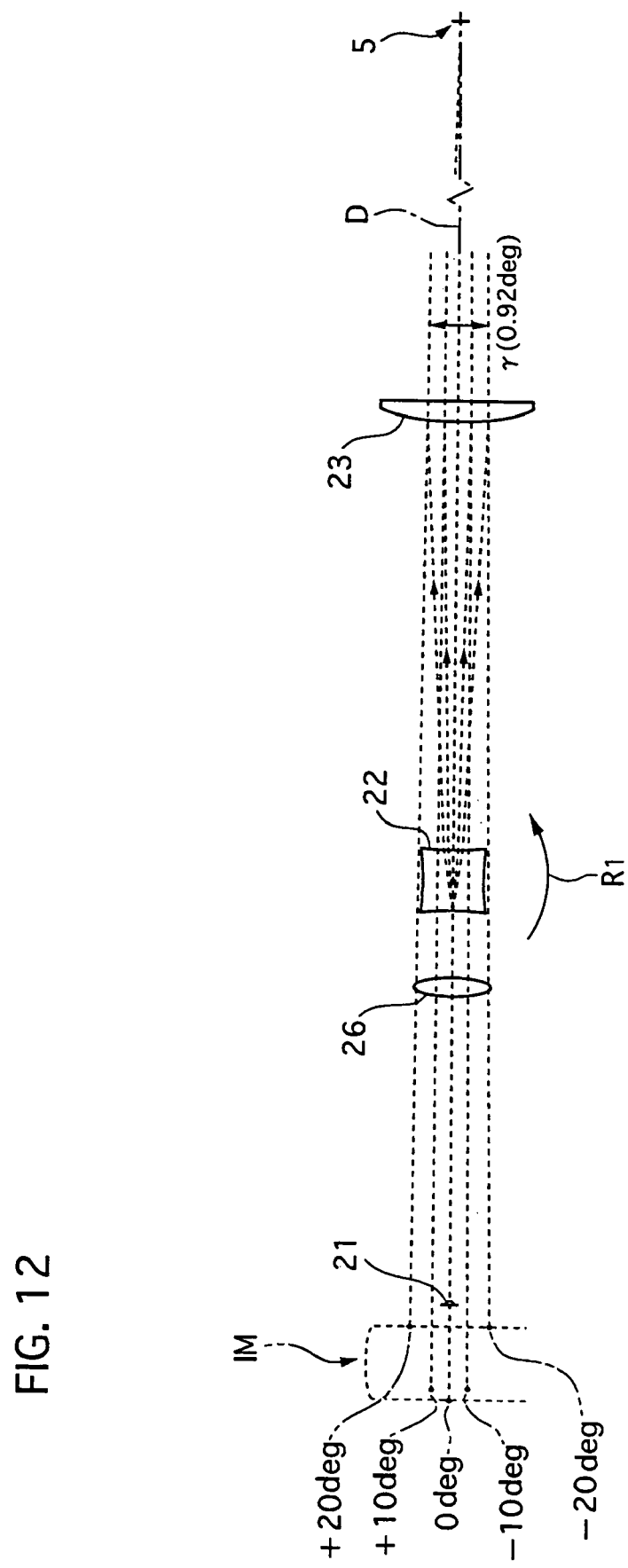
FIG. 12 is a schematic diagram illustrating production of a virtual display image obtained by the display device shown in FIG. 9A when the LED array is controlled to emit light in sync with rotation of the first optical system.

FIG. 12 shows a state of beam paths when the prism 22 is rotated so as to produce the virtual display image.

When the prism 22 is rotated in a counterclockwise direction $R_1$ and arrives in a sequential order, for example, at an angle of 20 degrees in a clockwise direction from the reference angle, at an angle of 10 degrees in the clockwise direction from the reference angle, at an angle of 0 degree (equal to the reference angle), at an angle of 10 degrees in the counterclockwise direction from the reference angle, and at a 20 degrees in the counterclockwise direction from the reference angle, the beams are slanted according to the angles of the prism 2 and enter the lens 3 as shown in FIG. 12. The beams exiting the prism 22 enter the lens 23, and are hereby converged so as to travel to the eye point 5.

In the above-constructed display device, the virtual image IM observable from the eye point 5 is produced at positions from 5 mm to 25 mm behind the LED array 21 according to the rotation angle of the prism 22. As the rotation angle of the prism 22 becomes nearer to the reference angle, a position of the image production becomes further from the eye point 5 as shown in FIG. 12.

The positions of the image production vary in a main optical axis direction according to the rotation angles of the prism 22, but this variations are no problem from a practical standpoint. Although the prism 22, the lens 23, and the lens 26 have diverge/converge functions on the plane, the image can be produced at a satisfactory level, which is no problem in astigmatism. Incidentally, a display angle $\gamma$ in a rotary scanning direction becomes to be about 0.92 degrees in a case that the prism 22 is rotated 20 degrees counterclockwise from the reference angle, for example. A deflection amount of the beam due to the rotation of the prism 22 can be set larger, because the lens 26 is added to the display device, and accordingly the light emitted from the LED array 21 is able to be diverged largely by the prism 22.

As described above, the display device of the second embodiment can produce a two-dimensional virtual display image, which is visible to a user due to persistence of vision, without a screen. A light energy loss is reduced because of removal of a screen and so forth, which enables the display device to use a light source of a low output capacity and small size, resulting in cost reduction. Besides, the display device does not need a polygonal column-like mirror, resulting in further cost reduction. Because of no screen, the display device can suppress deterioration of display contrast due to the outside light entering the display device.

Using the prism 22 and controlling its rotation can decrease load of the drive unit 11, resulting in low electric power consumption, downsizing, reduction of noise, and a longer operating life of the display device. Besides, a period unavailable for producing a display image during the rotation of the prism 22 can be reduced, which brings reduction of light-emitting energy of the LED array 21, resulting in low electric power consumption, downsizing, reduction of noise, and a longer operating life of the display device.

Focus of the lens 26 is positioned between the prism 22 and the lens 23, which enables the prism 22 to have the larger deflection amount of the light. Therefore, the display device can enlarge the virtual image in the rotary scanning direction. The display image can be obtainable in sufficiently large size even when a distance between opposite surfaces of the prism 22 is set to be smaller. That is, the prism 22 can be formed thin, resulting in easy manufacturing and cost reduction.

The prism 22, the lens 23, and the lens 26 converge the light only in a direction perpendicular to an LED arrangement direction of the LED array 21, that is, they do not converge the light in the LED arrangement direction. Therefore, variation of display distortion is suppressed at low level even when the eye point 5 of the user moves a relatively long distance in the LED arrangement direction.

Next, a display device of a third embodiment according to the present invention will be described with reference of the accompanying drawings of FIGS. 13 and 15.

Figure 13:
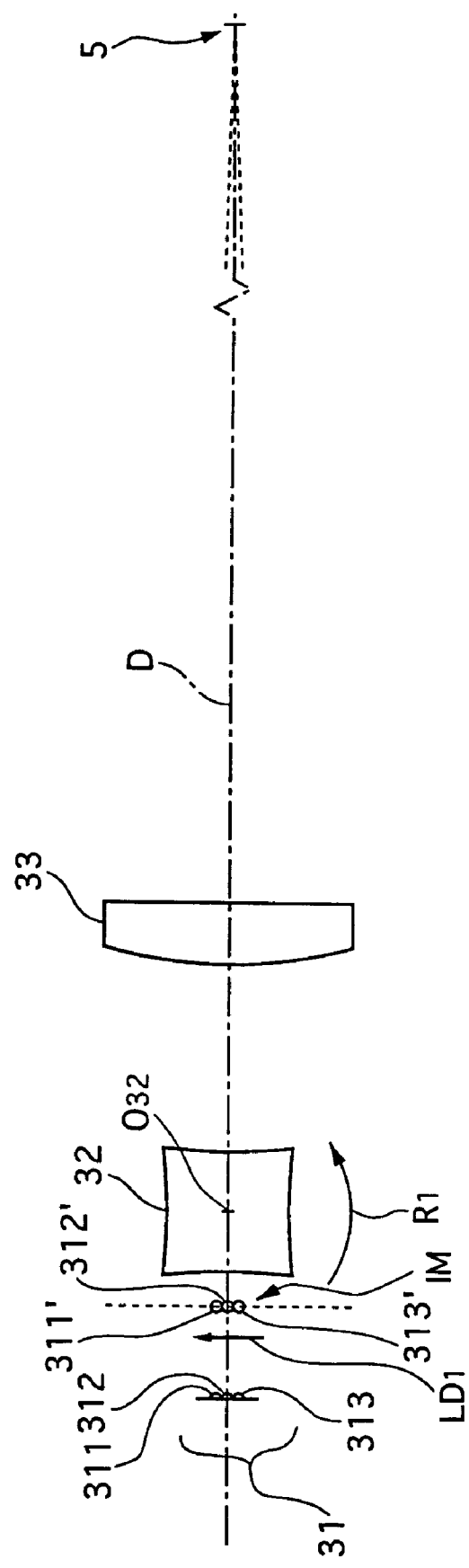
FIG. 13 is a schematic side view showing an optical system of a display device of a third embodiment according to the present invention.
Figure 14:
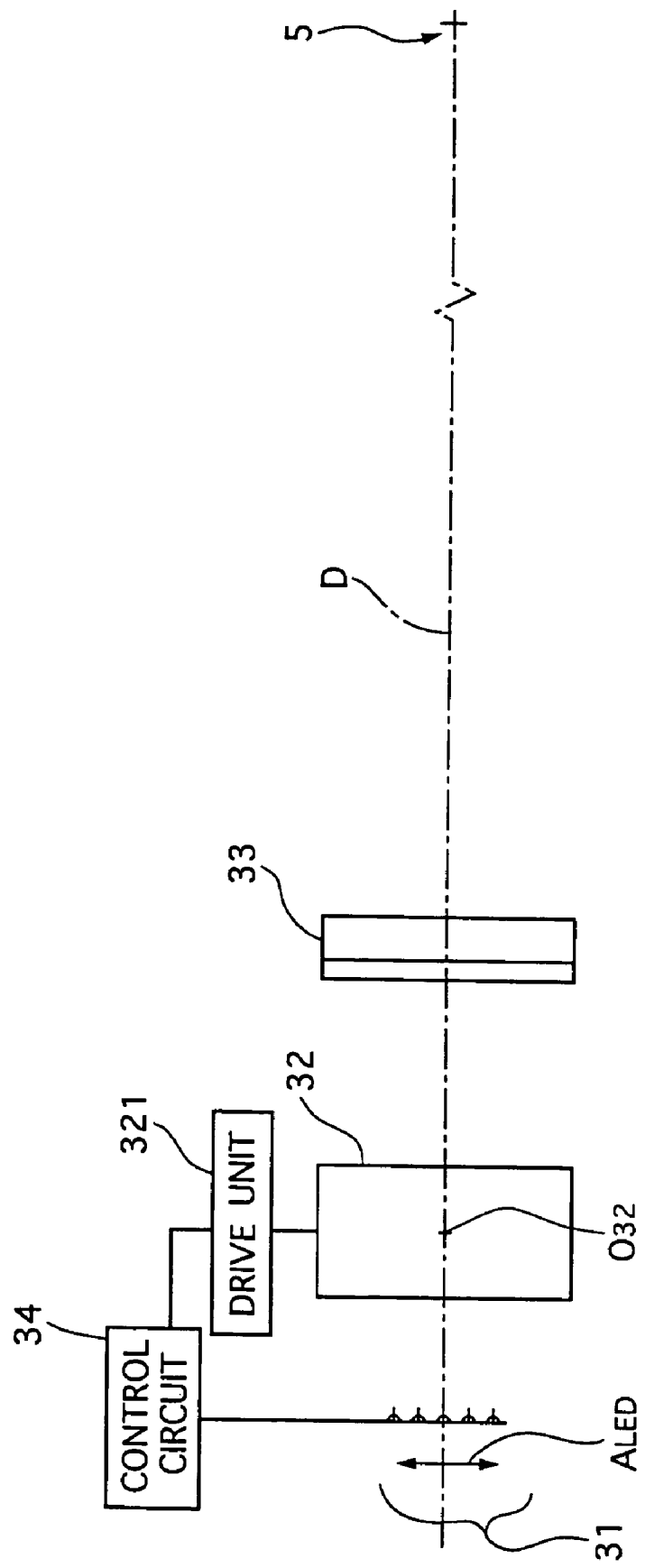
FIG. 14 is a schematic plan view showing the optical system and an electronic system used in the display device of the third embodiment shown in FIG. 13.

Referring to FIGS. 13 and 14, in this display device, an LED array 31 includes a first LED array 311 to emit red light, a second LED array 312 to emit green light, and a third LED array 313 to emit blue light, and consists of 5×3 LEDs in total. The first to third LED arrays 311 to 313 are arranged in line. The other parts, including a prism 32, a lens 33, a control unit 34, and a drive unit 321, of the display device are constructed similarly to those of the first embodiment shown in FIGS. 1 and 2.

The operation and advantages of the display device of the third embodiment will be described.

As shown in FIG. 13, virtual display images IM, consisting of a red image 311', a green image 312', and a blue image 313', of the first to third LED array 311, 312, and 313 are produced, respectively; when the prism 32 is positioned at a reference angle. These three-colored images 311' to 313' can be produced at the same position by controlling light-on timing of the first to third LED arrays 311 to 313 so as to be delayed between one another.

Figure 15:
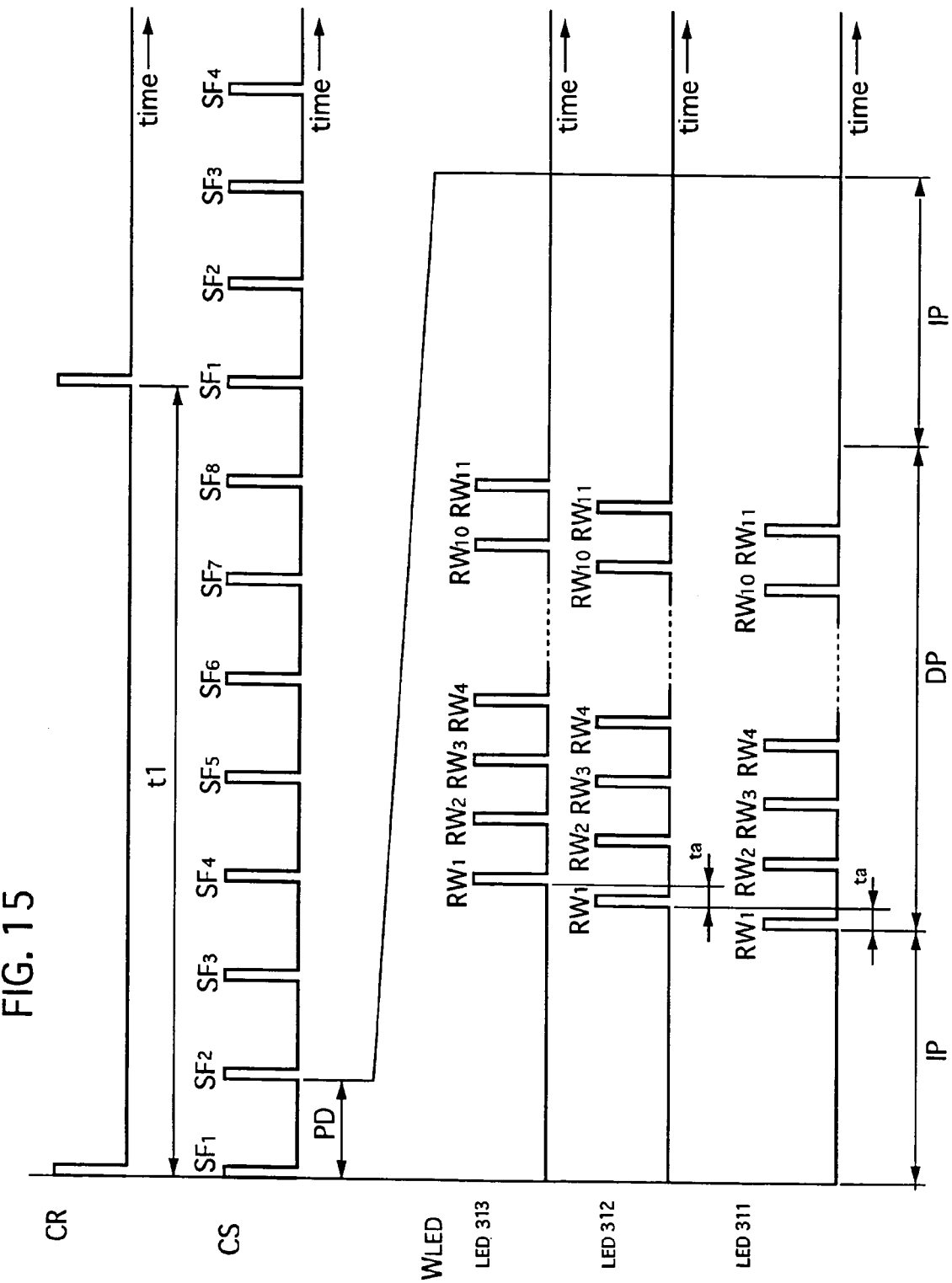
FIG. 15 is a time chart of controls of an LED array and an electric motor performed in the display device shown in FIG. 13.

Specifically, as shown in FIG. 15, when the prism 32 is rotated counterclockwise around a center axis $O_{32}$, light-emitting start time of the first LED array 3-11 is set to be advanced by a predetermined period ta from that of the second LED array 312, and that of the third LED array 313 is set to be delayed by the time ta from that of the second LED array 312, where the ta is a period in which the virtual images can move distances between positions of red and green images and between positions of green and blue images.

Therefore, producing the above three-colored images on the same position enables the display device to generate a virtual display image in color by adequately controlling intensity of the three colored light.

Instead of timing shift control described above, the display device may use an LED array having three aggregated LEDs that can emit a red, green, and blue lights, respectively, and are contained in one LED case. This enables the display device to produce a colored virtual display image without timing shift control.

The display device of the third embodiment has the following advantages.

This display device can produce a two-dimensional virtual display image, which is visible to a user due to persistence of vision, without a screen. A light energy loss is reduced because of removal of a screen and so forth, which enables the display device to use a light source of a low output capacity and small size, resulting in cost reduction. Besides, the display device does not need a polygonal column-like mirror, resulting in further cost reduction. Because of no screen, the display device can suppress deterioration of display contrast due to the outside light entering the display device.

Using the prism 32 and controlling its rotation can decrease load of the drive unit 321, resulting in low electric power consumption, downsizing, reduction of noise, and a longer operating life of the display device. Besides, a period unavailable for producing a display image during the rotation of the prism 32 can be reduced, which brings reduction of light-emitting energy of the LED array 31, resulting in low electric power consumption, downsizing, reduction of noise, and a longer operating life of the display device.

The prism 32, and the lens 33 converge the light only in a direction perpendicular to an LED arrangement direction of the LED array 31, that is, they do not converge the light in the LED arrangement direction. Therefore, variation of display distortion is suppressed at low level even when the eye point 5 of the user moves a relatively long distance in the LED arrangement direction.

The LED array 31 has the first to third LED arrays 311 to 313 that can emit red, green, and blue light, respectively, which enables the display device to produce a virtual display image in color, resulting in increase of display information and improvement of visibility. For example, a normal image is displayed in blue and/or green, and an alert image for a driver is displayed in red, ensuring alert to the driver with respect to contents of the display information.

In addition, a virtual display image can be produced in multi-color by using at least two color lights, and in full-color by using three primary color (red, green, and blue) lights.

The control circuit 34 controls light-on timing of the first to third LED arrays 311 to 313 so that variations among image-formation positions from the eye point 5 of a driver can be compensated, although the variations occurs in different colored display images due to chromatic aberration of the prism 32 and the lens 33. Therefore, the virtual display images in different colors are compensated in their variations of the image-formation positions and in color drift.

Next, a display device of a fourth embodiment according to the present invention will be described with reference of the accompanying drawing of FIG. 16.

Figure 16A:
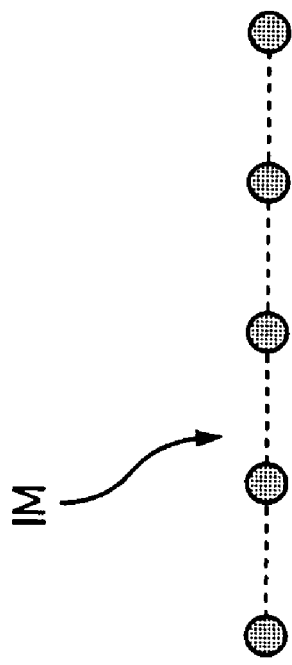
FIG. 16A is a schematic diagram showing a compensated virtual display image produced on a front window glass of a motor vehicle.
Figure 16B:
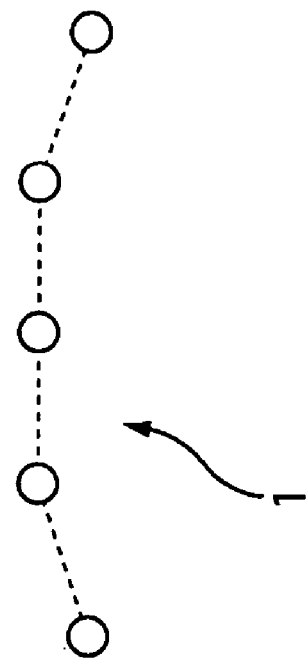
FIG. 16B is an LED arrangement of LEDs used in a display device of a fourth embodiment according to the present invention for compensating image distortion due to curvature of the front window glass.

FIG. 16A shows a compensated virtual display image produced on a front window glass of a motor vehicle. Its display distortion due to a curvature of the window glass is compensated by an LED arrangement of a LED array 1 so that the virtual display image can be seen on a straight line by a driver. For this purpose, LEDs of a LED array 1 are arranged according to the curvature of the window glass as shown in FIG. 16B.

The operation of the display device of the fourth embodiment is similar to that of the first embodiment, and has the following advantages.

This display device can produce a two-dimensional virtual display image due to persistence of vision without a screen. A light energy loss is reduced, and the display device can employ a light source of a low output capacity and small size, and a low cost. It can suppress deterioration of display contrast due to the outside light entering the display device. Besides, it does not need a polygonal column-like mirror, resulting in further cost reduction.

Using the prism and controlling its rotation can decrease load of the drive unit, resulting in low electric power consumption, downsizing, reduction of noise, and a longer operating life of the display device. Besides, a period unavailable for producing a display image during the rotation of the prism can be reduced, which brings reduction of light-emitting energy of the LED array, resulting in low electric power consumption, downsizing, reduction of noise, and a longer operating life of the display device.

The display distortion of the virtual display image can be compensated even when it is produced by reflection on the window glass of complicate three-dimensional figuration.

While there have been particularly shown and described with reference to preferred embodiments thereof, it will be understood that various modifications may be made therein, and it is intended to cover in the appended claims all such modifications as fall within the true spirit and scope of the invention.

For example, the first optical system may have other configuration instead of the square-pole having concave surfaces used in the embodiments.

The first optical system can be rotated by any other rotating unit instead of the electric motor used in the embodiments. The rotating unit is preferably made at low cost and in compact.

The control unit may have a function of controlling other devices.

The second optical system and/or the third optical system may have a configuration and/or characteristics different from those of the embodiments.

The front window glass is preferable for using the display device in a motor vehicle, but the display device can be used except motor vehicles, and the window glass may be replaced by other member, or may be removed.

The entire contents of Japanese Patent Application No. 2004-090176 filed Mar. 25, 2004 is incorporated herein by reference.

What is claimed is:

1. A display device to produce a virtual display image based on image information, the display device comprising:
   a plurality of light emitting elements disposed in line;
   a first optical system made of a translucent medium in which light emitted from the light emitting elements to enter the translucent medium is diverged after passing through the first optical system;
   a rotating unit to rotate the first optical system;
   a control unit to control lighting-on and lighting-off of the light emitting elements in sync with rotary movement of the first optical system and according to the image information to be displayed; and
   a second optical system to converge the light passing through the first optical system and entering the second optical system to produce the virtual display image.

2. A display device according to claim 1, wherein
   the first optical system has at least two surfaces that the light enters and exits, respectively, the surfaces each being formed in a concave shape, and the first optical system being rotated by the rotating unit so that the surfaces reach in turn and repeatedly positions where the light enters and exits, respectively, at a predetermined rotation angle of the first optical system.

3. A display device according to claim 2, further comprising,
a third optical system for focusing the light emitted from the light emitting elements on a position between the first optical system and the second optical system.

4. A display device according to claim 2, wherein
the light emitting elements includes light emitting elements that are capable of emitting light in more than one color.

5. A display device according to claim 2, wherein
the light passes through the first optical system and is reflected from a window glass having a curvature of a motor vehicle so as to be seen as the virtual display image, and
the light emitting elements being arranged according to the curvature of the window glass so as to compensate display distortion of the virtual display image due to the curvature.

6. A display device according to claim 1, further comprising,
a third optical system for focusing the light emitted from the light emitting elements on a position between the first optical system and the second optical system.

7. A display device according to claim 6, wherein
the light emitting elements includes light emitting elements that are capable of emitting light in more than one color.

8. A display device according to claim 6, wherein
the light passes through the first optical system and is reflected from a window glass having a curvature of a motor vehicle so as to be seen as the virtual display image, and
the light emitting elements being arranged according to the curvature of the window glass so as to compensate display distortion of the virtual display image due to the curvature.

9. A display device according to claim 1, wherein
the first optical system diverges the light emitted from the light emitting elements only on a plane perpendicular to an arrangement direction of the light emitting elements, and
the second optical system converges the light traveled from the first optical system only on a plane perpendicular to a main optical axis of the first and second optical systems and also to a plane on which the main optical axis and the light emitting elements are located.

10. A display device according to claim 9, further comprising,
a third optical system for focusing the light emitted from the light emitting elements on a position between the first optical system and the second optical system.

11. A display device according to claim 9, wherein
the light emitting elements includes light emitting elements that are capable of emitting light in more than one color.

12. A display device according to claim 9, wherein
the light passes through the first optical system and is reflected from a window glass having a curvature of a motor vehicle so as to be seen as the virtual display image, and
the light emitting elements being arranged according to the curvature of the window glass so as to compensate display distortion of the virtual display image due to the curvature.

13. A display device according to claim 1, wherein
the light emitting elements disposed in line are arranged in a plurality of rows.

14. A display device according to claim 13, wherein
the light emitting elements includes light emitting elements that are capable of emitting light in more than one color.

15. A display device according to claim 1, wherein
the light emitting elements includes light emitting elements that are capable of emitting light in more than one color.

16. A display device according to claim 15, wherein
the control unit controls light-emitting timing of the light emitting elements so that variation, due to chromatic aberration of at least one of the first and second optical system, between image-formation positions can be compensated to be smaller.

17. A display device according to claim 1, wherein
the light passes through the first optical system and is reflected from a window glass having a curvature of a motor vehicle so as to be seen as the virtual display image, and
the light emitting elements being arranged according to the curvature of the window glass so as to compensate display distortion of the virtual display image due to the curvature.

18. A display device according to claim 1, wherein
the first optical system is stopped at a rotation angle where an outside light entering the second optical system passes therethrough with being slanted away from the light emitting elements, in a case that the display image is unnecessary to be provided.

19. A display device according to claim 1, wherein
the light emitting elements are made up of light emitting diodes.

* * * * *